J. A. GORDANIER.
COLLAPSIBLE BED FOR AUTOMOBILES.
APPLICATION FILED JUNE 17, 1918.
1,284,651.
Patented Nov. 12, 1918.
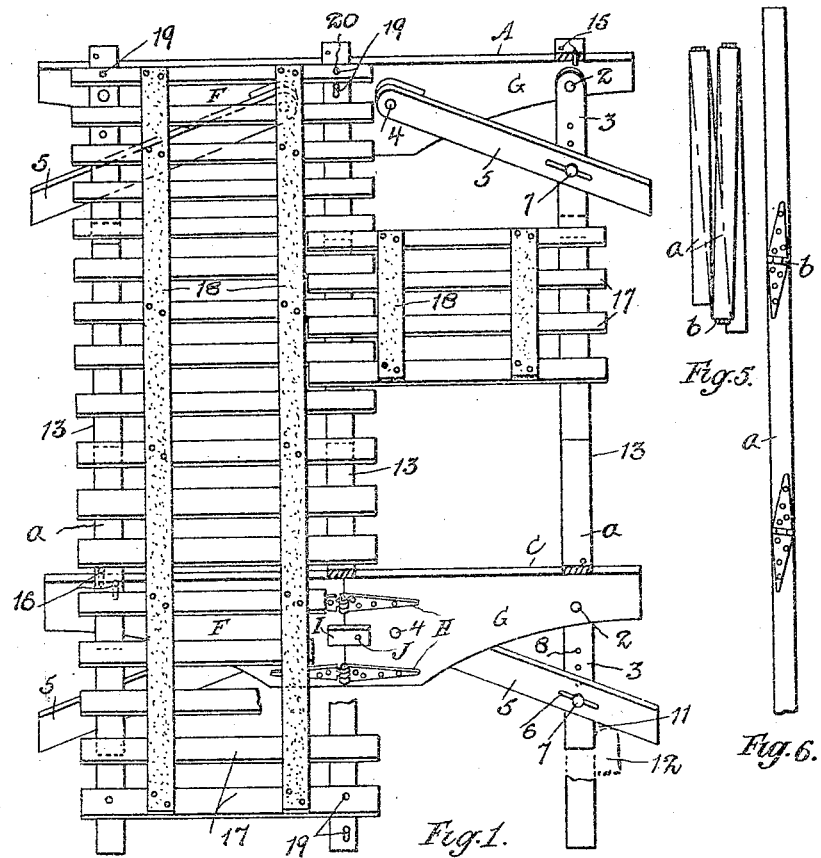
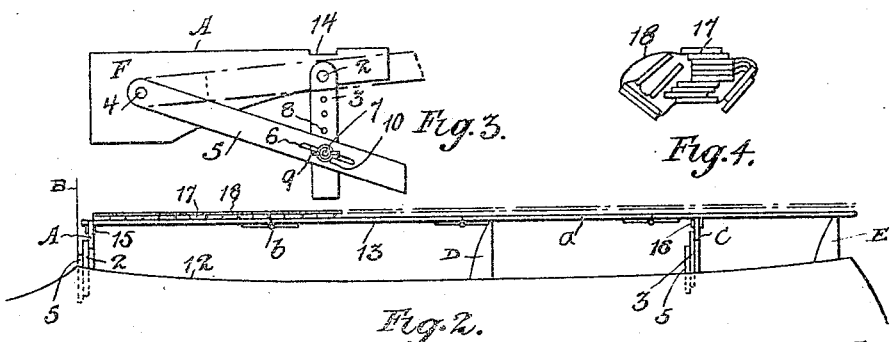
Inventor:
J. A. Gordanier
by Egerton R. Case
Atty.

UNITED STATES PATENT OFFICE.

JAMES ALMON GORDANIER, OF TORONTO, ONTARIO, CANADA.

COLLAPSIBLE BED FOR AUTOMOBILES.

1,284,651.  Specification of Letters Patent.  Patented Nov. 12, 1918.

Application filed June 17, 1918. Serial No. 240,459.

*To all whom it may concern:*

Be it known that I, JAMES ALMON GORDANIER, a subject of the King of Great Britain, of the city of Toronto, county of York, Province of Ontario, Canada, have invented certain new and useful Improvements in Collapsible Beds for Automobiles, of which the following is a specification.

My invention relates to improvements in collapsible beds for automobiles, and the object of my invention is to construct a collapsible bed which can be folded to occupy a relatively small compass when stowed away in the automobile when not in use, and which, when erected or put together, can be supported by the body of the car so as to provide a comfortable means upon which to rest or sleep, and the construction of my invention will be hereinafter particularly set forth, and what I claim as new will be pointed out in the claims forming part of this specification.

Figure 1 is a perspective view of my collapsible bed in position for use, certain parts being removed to facilitate illustration. Fig. 2 is a side elevation of my bed showing the same mounted for use in an automobile, a portion of the body of which is shown conventionally. Fig. 3 is a side elevation of one of the collapsible transverse supporting members, partly collapsed. Fig. 4 is an end elevation of one of the mattresses rolled up. Fig. 5 is a plan view of one of the stringers in collapsed position, and Fig. 6 is a plan view of the underside of one of the stringers opened out, showing the particular manner in which the hinges are coupled thereto.

In the drawings, like characters of reference refer to the same parts.

The advent of the automobile has necessitated some means whereby, broadly speaking, the same can be turned into a sleeping compartment when occasion arises, and in the following specification I shall describe my invention in its preferred form and a manner in which the same can be mounted for use.

Two collapsible transverse supporting members are provided, the front member A of which is positioned adjacent the windshield B, and the rear member C of which is positioned at a convenient point between the seats D and E. Each of these members is composed of two sections F and G held in alinement by any suitable means which will permit the ready collapse of said members when desired. The preferred coupling means used comprises hinges H which are secured to the said sections, as shown particularly in Fig. 1, on the same side of each supporting member. To additionally stiffen the said supporting members, when opened out, a button I is pivoted as at J to one of the sections of the said members and is designed to overlap the other section. By moving the button I out of contact with the section F, the transverse member C may be collapsed. The construction just described is substantially the same in connection with the supporting member A. Pivoted, as at 2, to each outer end of each section of the said supporting members A and C, is a support 3. Pivoted to each of the sections of the said supporting members A and C, near their inner hinged ends, are a pair of struts 5. These struts are fixed in adjusted position near their outer ends to their associated supports 3. Each strut 5 is provided with a longitudinal slot 6 through which passes a bolt 7, which bolt is held in the desired hole 8 formed in the supports 3. A wing-nut 9 screws on the threaded end of each bolt 7 and co-acting with a washer 10 clamps the said struts and support in adjusted position at each side of the bed. As shown in Fig. 1, the relative position of the lower ends of the struts 5 and supports 3 form crotches 11, and it is by means of these crotches that the transverse supporting members A and C are supported on the sides 12 of the vehicle body. As shown in Fig. 2, naturally the bed must extend over the tops of the seats, and, therefore, since the height of the seats in various automobiles varies, the struts 5 and supports 3 are adjustably combined so as to position the tops of the transverse supporting members A and C at the right height with respect to the height of the seats. After the said transverse supporting members A and C have been placed in position by adjusting where necessary, the stringers 13 are placed on said supporting members and with their rear ends resting upon the back seat E. The front transverse supporting member A is preferably notched as shown at 14 in Fig. 3, so as to receive, flush with its top, the forward ends of the stringers 13. Any suitable means such as pins 15 are carried by the forward ends of said stringers and in staggered position so that they will straddle the supporting member A and prevent longitudinal displacement of the said stringers. Similar pins 16 are similarly carried by these stringers and the same straddle the top edge of the rear member C, for the purpose set forth. When the said stringers have been placed, the mattress is then placed thereon. This mattress is preferably made in two sections, and the same comprises a plurality of cross slats, spaced apart and coupled together by any suitable flexible means 18, well known in the art of upholstering. The said stringers, which are preferably three in number, are provided with pins 19, and since the slats at each end of each mattress section are provided with holes 20, the said end slats are secured to said stringers through the medium of the pins 19 to prevent displacement thereof.

Upon referring to Fig. 1, it will be noticed that the slats of one mattress section extend some distance between the inner ends of the slats of the other mattress section, and this fact, not only keeps the upper surface of the slats substantially in the same plane, but also enables me to make use of a middle stringer to support the inner ends of the slats of each mattress section.

The stringers 13 are made up of a plurality of sections *a*, coupled together by suitable hinges *b*. These hinges are preferably positioned at an angle to the longitudinal axis of each section *a* so that when these sections are folded, they will occupy substantially the position shown in Fig. 5, and thus be in compact form to be readily housed.

Each mattress section can be readily removed from its supporting stringers and rolled up to occupy small compass as shown in Fig. 4.

I have illustrated my invention as constructed in the form of a double bed or couch, though it will be understood that a single bed or couch may be made.

It will be observed that the struts 5 are provided with blocks *c* so that the main portions of these struts may be offset from their associated transverse supporting members to permit the supports 3 to be housed thereunder when the supporting members A and C are completely collapsed as shown by dotted lines in Fig. 3.

The adjustable relationship of the supports 3 and struts 5 will allow for the fitting of the members A and C to car bodies of different widths.

Various changes in construction may be made in the invention herein shown and described without departing from the scope of protection desired.

Claims:

1. A collapsible bed for automobiles comprising front and rear transverse supporting members each composed of two sections hinged together; adjustable means hinged to each of the said sections whereby these sections are supported on the car body at the required height; a plurality of collapsible stringers supported on said members and extending longitudinally thereof; means whereby said stringers are held in removable relationship in respect of said members so as to prevent their longitudinal displacement, and a flexible mattress supported by said stringers and comprising a plurality of slats; flexible means coupling said slats together, and means whereby said collapsible mattress is coupled to said stringers to prevent its accidental displacement.

2. A collapsible bed for automobiles comprising front and rear transverse supporting members each composed of two sections hinged together; a button pivoted to one of said sections and designed to overlap the other to stiffen these members when opened out; a support pivoted at each end of said members and provided with a plurality of holes; a slotted strut pivoted to each of the sections of the said members near their inner hinged ends; fastening means held in the slot of each strut and extending through the required holes in the associated pivoted support for said strut to hold these elements in adjusted position; a plurality of collapsible stringers supported on said members and extending longitudinally thereof; means whereby said stringers are held in removable relationship with respect to said members so as to prevent their longitudinal displacement, and a flexible mattress supported by said stringers and comprising a plurality of slats; flexible means coupling said slats together, and means whereby said collapsible mattress is coupled to said stringers to prevent its accidental displacement.

3. A transverse supporting member for a collapsible bed for automobiles comprising two sections; means whereby these sections are hinged together at their inner ends; a support pivoted near the outer end of each of the said sections; a strut pivoted to each of the said sections near their hinged ends; the said struts co-acting with the said supports so that these supporting members may be adjusted according to the height of the seats and the width of the car body, and means for holding the strut and support at each end of the said member in adjusted position so as to form a supporting crotch, for the purpose specified.

4. As a new article of manufacture, a stringer composed of a plurality of sections, and a leaf-hinge positioned to couple the abutting ends of said sections together and lying with its longitudinal axis at an angle to the longitudinal axis of said stringer so that the same may be folded into compact form, as shown and described.

JAMES ALMON GORDANIER.

Copies of this patent may be obtained for five cents each, by addressing the "Commissioner of Patents, Washington, D. C."